Patented Dec. 31, 1935

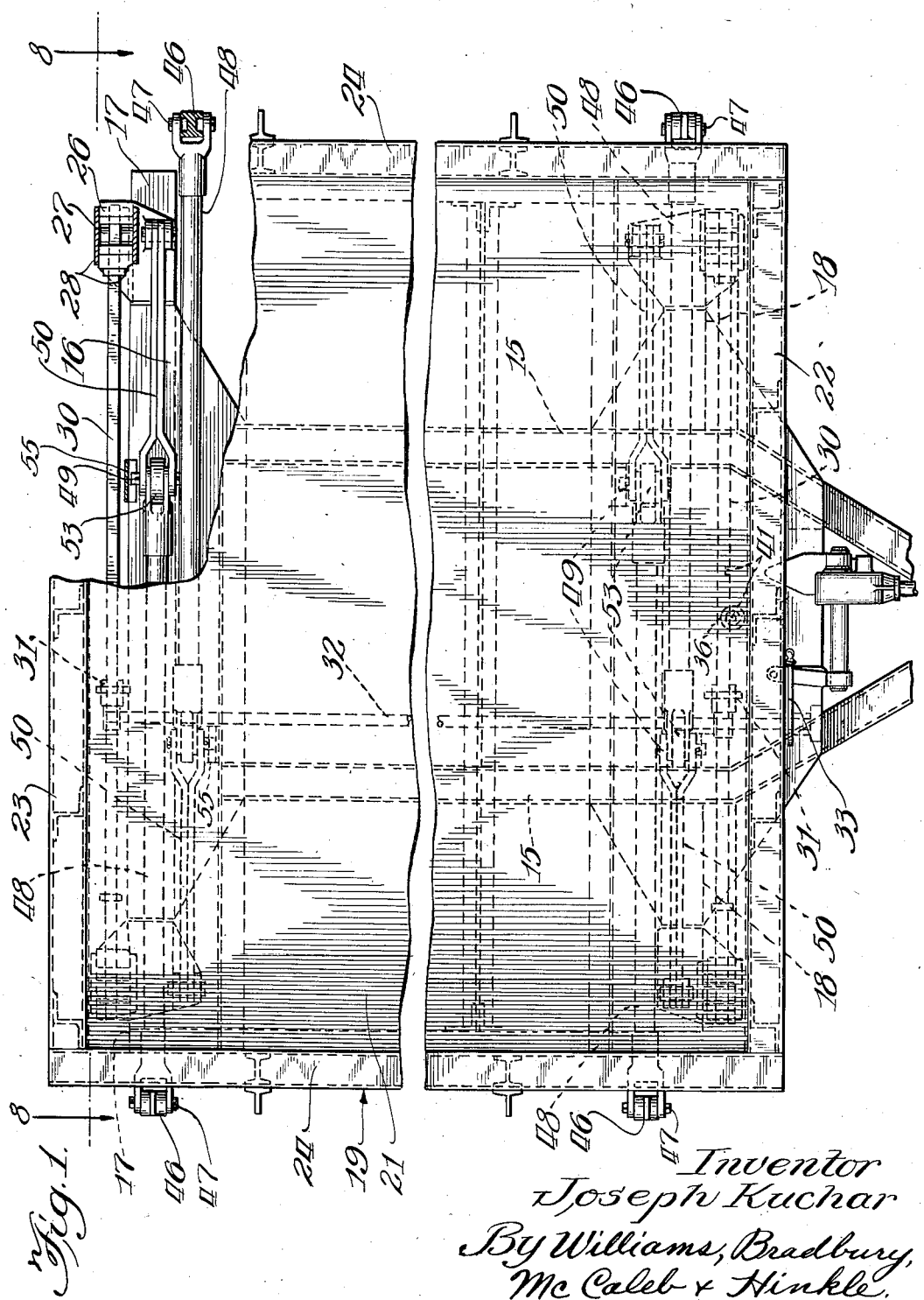

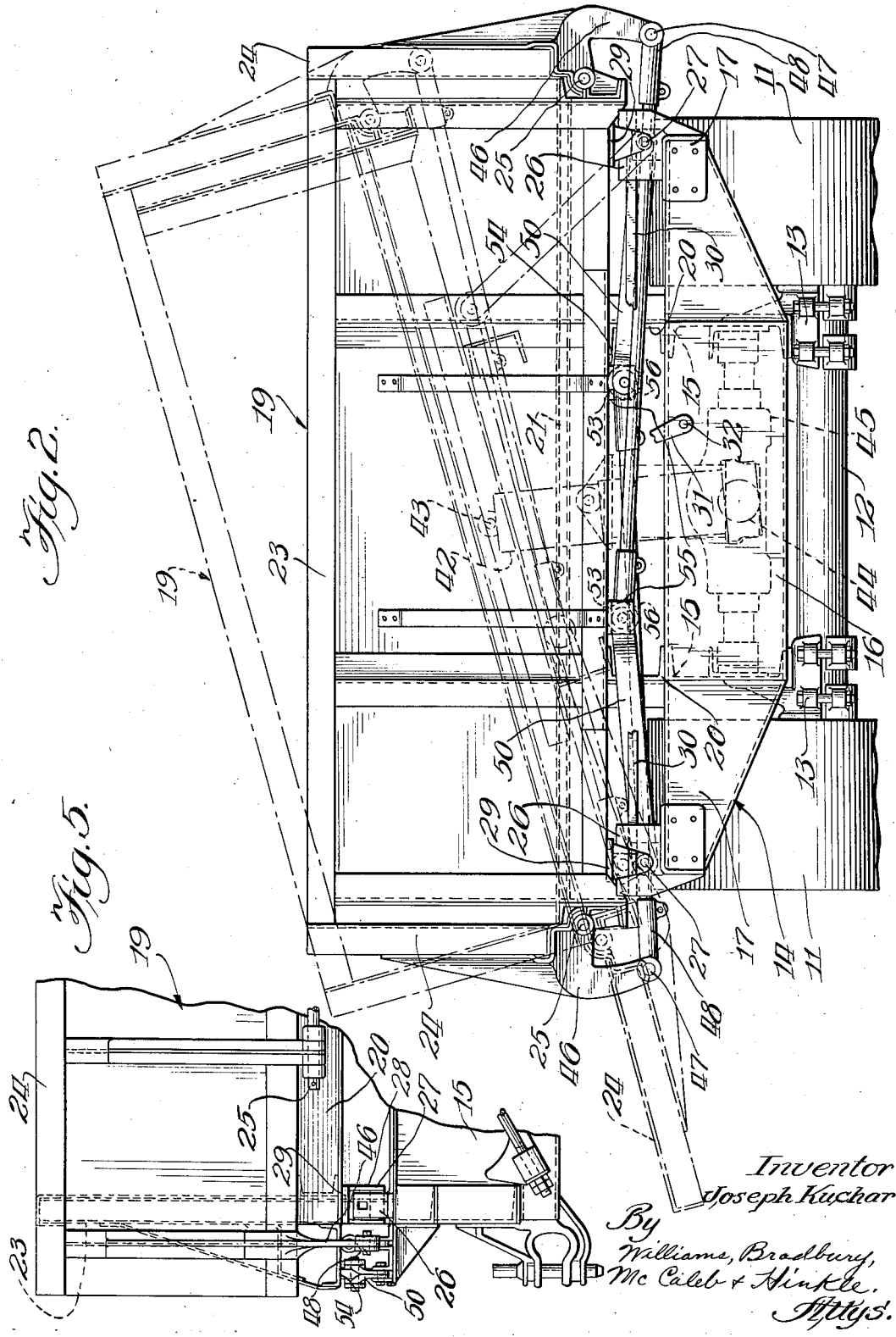

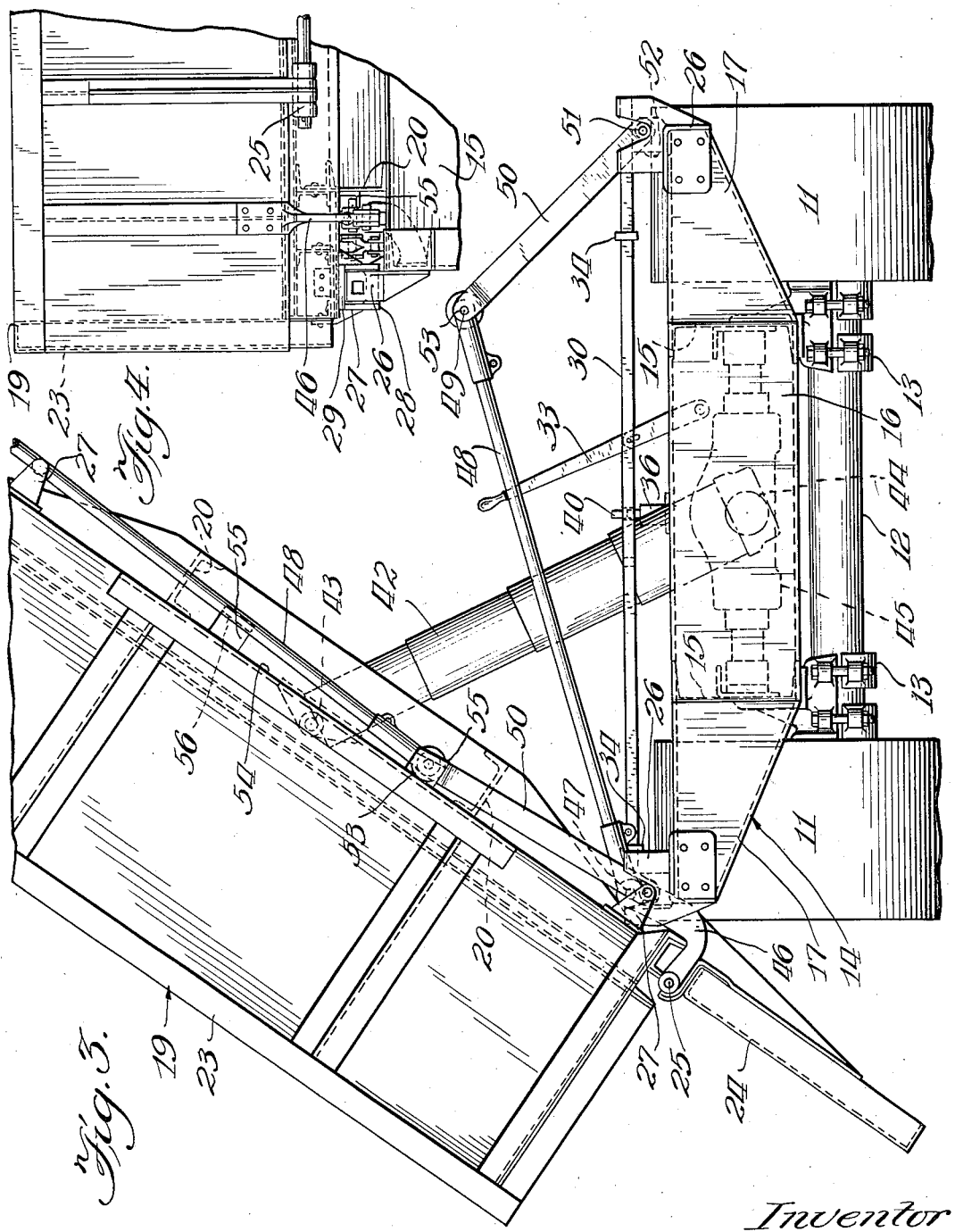

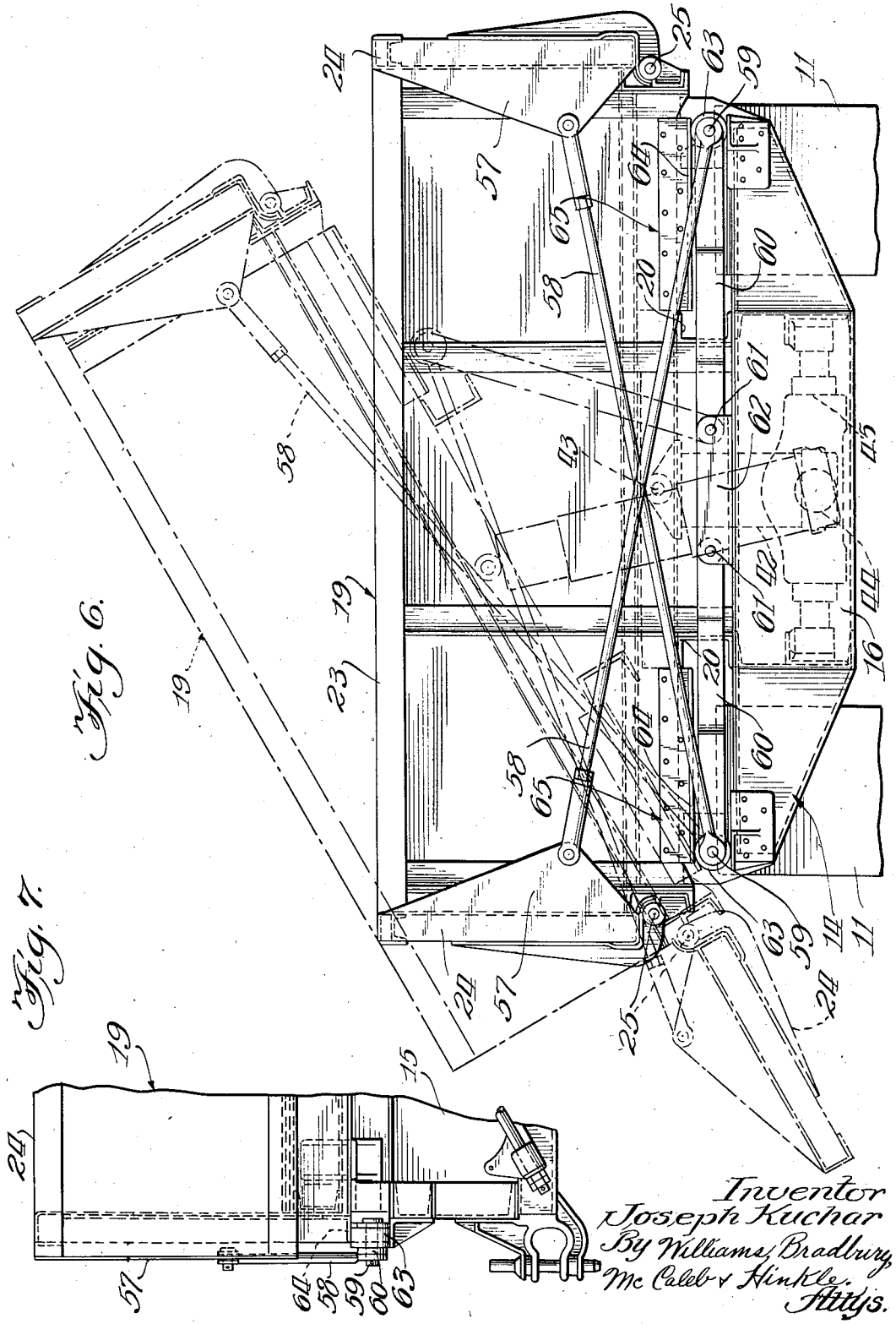

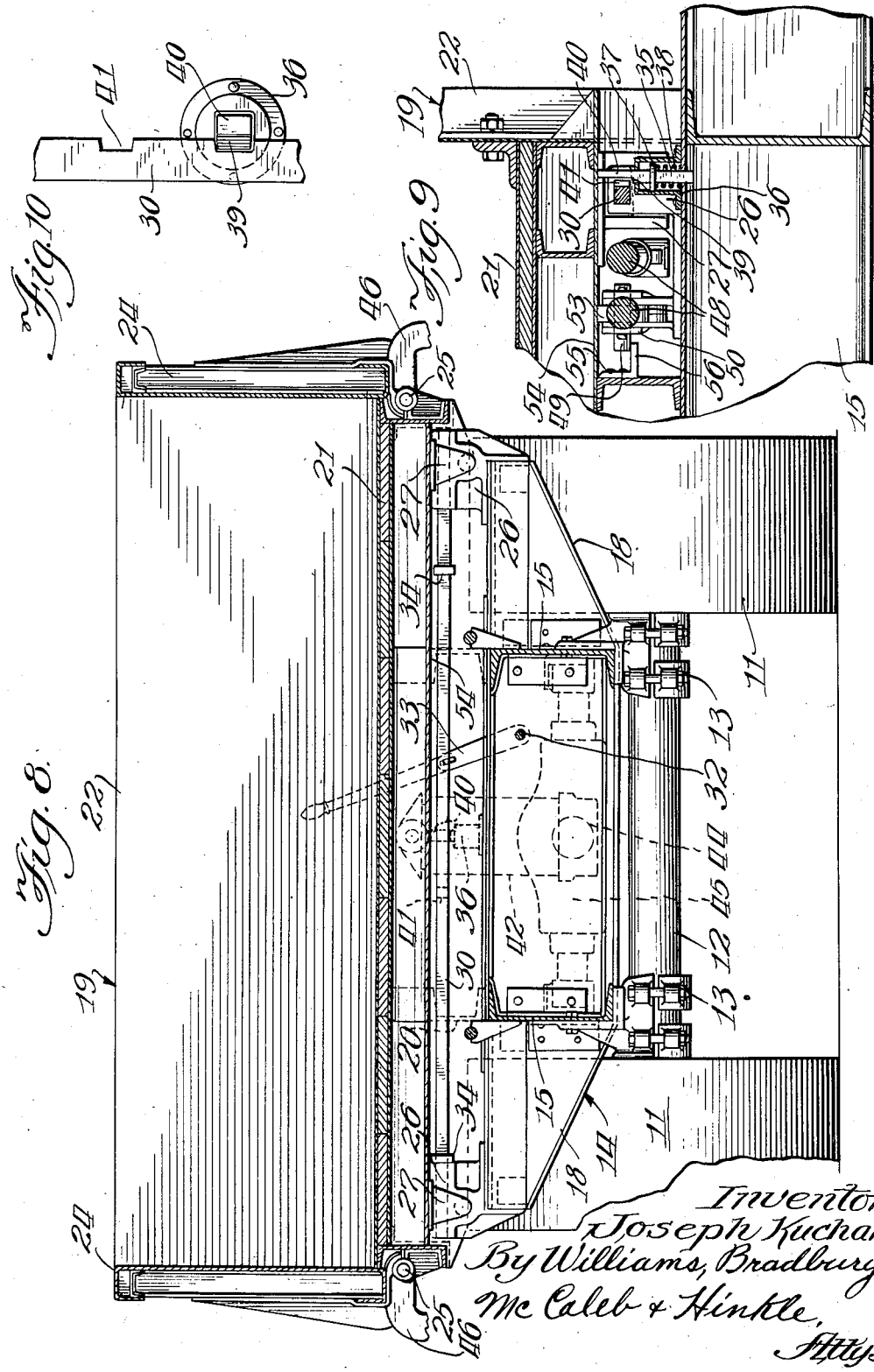

2,025,753

UNITED STATES PATENT OFFICE 2,025,753

SIDE DUMP WAGON

Joseph Kuchar, Chicago, Ill., assignor to Athey Truss Wheel Co., Chicago, Ill., a corporation of Illinois Application February 19, 1932, Serial No. 593,961

19 Claims. (Cl. 298—18)

This invention relates to side dump wagons and particularly to such wagons which are provided with gates which automatically open when the wagon is tilted to dump the load.

One of the objects of the invention is to provide an improved wagon of this type.

A further object of the invention is to provide a dumping wagon having an improved gate opening linkage operable to open a gate when the wagon is tilted in one direction and inoperative when the wagon is tilted in the opposite direction.

A further object of the invention is to provide a dump wagon having gates which automatically open to their fullest extent when the load is tilted through a relatively small angle, for example an angle of the order of about 15 degrees.

A further object of the invention is to provide a dump wagon having linkages for automatically opening the gates when the wagon is tilted, which are inexpensive to construct, and which are simple, durable, and effective in operation.

Other objects, advantages and capabilities of the invention will appear from the following description of preferred embodiments thereof taken in conjunction with the accompanying drawings, in which Figure 1 is a plan view of a wagon embodying my invention, the center portion being omitted and a corner being broken away to disclose the linkage;

Fig. 2 is an end elevation of the wagon;

Fig. 3 is a similar view of the wagon tilted to its fullest extent in one direction;

Fig. 4 is a detail view as seen from the side;

Fig. 5 is a view similar to Fig. 4 showing a somewhat different embodiment of the invention;

Fig. 6 is an end elevation of a wagon in which a modified form of linkage is employed;

Fig. 7 is a side detail view thereof;

Fig. 8 is a sectional elevation taken on the line 8—8 of Fig. 1, the linkages being omitted for the sake of clarity.

Fig. 9 is a sectional detail view taken on the line 9—9 of Fig. 8, and

Fig. 10 is a sectional plan detail view showing the means for locking the locking bar in one tilting position or the other.

Referring to the accompanying drawings, the reference numeral 11 designates wheels which may suitably be of the track laying type. These wheels support the axle 12 upon which is mounted by brackets 13 the chassis or frame 14.

The chassis or frame 14 comprises two longitudinal channels 15 which converge at their forward ends. At their rear ends the channels 15 are connected by a transverse member or beam 16 which provides brackets 17 projecting outwardly beyond the channels 15. The channels 15 also support brackets 18 at the position of the forward end of the wagon body 19, which brackets project into longitudinal alignment with the brackets 17.

The wagon body 19 is mounted on channels 20 which are adapted to rest upon the channels 15. The body comprises a bottom 21 which rests on a sub-structure supported on the channels 20, front and rear walls 22 and 23, and side gates 24 pivoted adjacent their lower edges on pivots 25, of which a suitable number are provided along the length of the gate. The gates 24, when opened, are adapted to abut upon the adjacent portions of the body so that they lie in alignment with the bottom 21 as shown in Fig. 3.

Each bracket 17 and 18 supports a socket member 26 which is provided with a longitudinal recess, in which is received a longitudinal fulcrum 27 supported on webs 28 which depend from a bracket 29, one of which is secured to the underside of the body at each corner thereof so as to register with the socket members 26.

Above the position of the fulcrum 27 when it is located in the longitudinal recess, each socket member is provided with openings in transverse alignment through which is adapted to pass a bar 30. As will readily be seen from Figs. 1 and 8, a bar 30 cooperates with the socket members 26 carried by the brackets 17 and another bar 30 cooperates with the socket members 26 carried by the brackets 18. The bars 30 have a slot and pin connection with arms 31 which are rigidly mounted on a rod 32 rotatably supported upon the chassis 14 and carrying a hand lever 33 at its forward end whereby the bars 30 may be thrown in one direction or the other transversely to free one or the other longitudinally aligned pair of fulcrums 27 as desired. The bars 30 are provided with stops 34 to limit the movement of said bars.

Means are preferably provided to lock the bars 30 in position after the body has started to tilt. Such means may comprise a bolt 35 which is slidably mounted in a housing 36, mounted on the frame adjacent one of the bars 30. The bolt is retained in the housing by a collar 37 against which bears a spring 38 which normally forces the bolt 35 upwardly. Part of the bolt 35 underlies the bar 30 and is cut away to provide a shoulder 39. The remaining part 40 of the bolt projects above the bar 30 and is adapted to be depressed by the body 19 in its normal position, as shown in Fig. 9. When the body is tilted about the fulcrum on one side or the other as determined by the position of the bars 30, the bolt 35 is forced upwardly by the spring 38 and the shoulder 39 passes through a slot 41 in the adjacent bar 30 and locks it against longitudinal movement until the bolt 35 is again depressed by the body 19 on its return to normal position. Two slots 41 are provided which register with the bolt 35 in the extreme positions of the bar 30 which correspond with the locking of the fulcrums 27 on one side or the other.

Any suitable known means may be employed to tilt the body. I prefer to employ an extensible ram 42 which is pivotally connected at 43 at its upper end to the sub-structure of the body and at 44 at its lower end to a transverse member 45 carried between the main channels 15 of the chassis 14.

In operating the vehicle to dump its load, the hand lever 33 is thrown in the direction in which it is desired to dump the load, for example to the left as viewed in Fig. 8. The resulting movement of the bars 30 locks the fulcrums 27 on the left hand side in their socket members 26 and leaves a free path for the fulcrums 27 on the right hand side so that they may lift vertically out of their socket members 26. This movement also brings one of the slots 41 into vertical alignment with the bolt 35 which is at this time held in its lowest position by its contact with the body 19. Pressure fluid, derived from a tractor or other suitable source is admitted into the ram 42 causing it to expand it and elevate the body about the left hand fulcrums 27. The ram 42 may be adapted to elevate the body through a suitable angle, for example 55 or 60 degrees. When the body starts to rise the shoulder 39 of the bolt 35 passes through the aligned slot 41 and locks the bars 30 against movement until the body returns to its normal position and depresses the bolt 35.

Means are provided for opening the gate 24 on the dumping side of the body when the tilting movement is in its initial stage. Such means will now be described.

Referring to Figs. 1 to 4 inclusive, it will be seen that adjacent each end, each gate 24 is provided with a downwardly projecting bracket 46 which is pivotally connected at 47 to a link 48 which extends inwardly between the body and the chassis. The inner end of the link 48 is forked and is pivotally connected at 49 to the forked end of a shorter link 50 which is pivotally connected at 51 to brackets 52 mounted on the brackets 17 or 18 as the case may be. The common pivots 49 of the links 48 and 50 carry rollers 53 which are adapted to bear against plates 54 carried on the underside of the body 19. The pivots 51 of the links 50 are in alignment or substantial alignment with the fulcrums 27, the pivot 51 of each linkage being located at the opposite side of the frame from the gate with which that linkage is connected.

It will readily be understood from Figs. 2 and 3 that if the fulcrums 27 on the left hand side of the wagon, as viewed in these figures, are locked in the manner above described and the ram 42 is extended, the plate 54 rises and the roller 53 follows it, being pressed upwardly by the weight of the gate 24 on the left hand side and the pressure of the load thereagainst. It will readily be seen from Fig. 2 that in normal position the links 48 and 50 lie at a relatively obtuse angle, so located that the roller 53 tends to move upwardly when permitted to do so by the plate 54. The relative lengths of the arm 46, link 48 and link 50 are such that the gate 24 opens rapidly, it being preferred that the gate should be fully open, that is in alignment with the floor 21 of the body when the body has been tilted through an angle of about 15 degrees. As indicated above, the gate now abuts on the body and maintains this position relative to the body during the rest of the upward tilting movement, which may be considerable, for example approximately 55 or 60 degrees. When the gate has become fully open or shortly thereafter, the plate 54 moves upwardly away from the roller 53 and the linkage 48, 50 is free to adjust itself in position dictated by the movement of the pivot 47.

When the ram 42 is permitted to collapse the body 19 moves toward its initial position until the plate 54 contacts with the roller 53. This occurs when the body has arrived at a position displaced from its normal position by about 15 degrees. Further downward movement of the body forces the roller 53 downwardly and inwardly so that the pivot 47 of the gate 24 receives an outward thrust which closes the gate, the gate being completely closed when the body has resumed its initial position.

It will be noted that during the dumping movement to the left and the return movement of the body above described the right hand gate is unaffected. This results from the fact that the pivot 51 of the linkage associated with the right hand gate is in alignment with the fulcrums 27 about which the body is turning. Therefore, no relative movement occurs between the links 48, 50 associated with the right hand gate and it remains in its initial position, relative to the body, throughout the dumping operation. Owing to the slight displacement of the links 48 and 50 out of alignment, in their normal position, it is desirable to provide means for supporting the pivot 49 of the inactive linkage to prevent it falling downwardly in case the parts have become excessively worn. This means may take the form of supports 55 mounted on the body and provided with projecting lugs 56 which are adapted to occupy a position immediately below the projecting ends of the pivots 49. It will readily be understood that during tilting the relative movement of the pivot 49 of the active linkage, along the plate 54, causes the pivot 49 to clear the lug 56. On the other hand, the lug 56 which underlies the pivot 49 of the inactive linkage remains beneath the projecting end of said pivot and prevents the linkage from falling downwardly.

As will be seen from Figs. 1 and 4, the links 48 and 50 may suitably be located beneath the body 19 and on the inner side of the adjacent fulcrums 27. This construction is particularly advantageous since the linkages are thus preserved from accidental damage or destruction. As shown in Fig. 5 the construction may be modified so as to locate the linkages outwardly beyond the ends of the wagon body and the fulcrums 27 and associated parts, the gates 24 being extended beyond the end walls 22 and 23 so as to locate the brackets 46 in corresponding position.

In the embodiment of the invention illustrated in Figs. 6 and 7, wagon construction is substantially the same as that in the embodiment previously described with the exception of the linkage and similar reference numerals are employed to designate similar parts.

In this embodiment each gate 24 is provided at each end with an inwardly directed flange or web 57 to which is pivotally attached, at a point above the pivots 25 of the gate, a link 58 which extends transversely across the end walls of the wagon body, its remote end normally occupying a position in alignment with the fulcrums 27 on the other side of the wagon from the gate 24 to which it is attached. This end of the link 58 is pivoted at 59 to a shorter link 60 which extends inwardly and is pivoted to the frame or chassis 14 adjacent its center. The link 60 may, for example be pivoted at 61 to an angle iron 62 mounted on a transverse member or beam 16 or other suitable part of the chassis. The pivot 59 carries a roller 63 which is normally engaged by the flange 64 of an angle iron 65 mounted on the end wall of the body.

As seen in full lines in Fig. 6 the relation of the links 58 and 60 is such that the gate 24 is closed by the force exerted by the flange 64 upon the roller 59. When the body is tilted, for example toward the left as viewed in Fig. 6, the flange 64 on the right hand side of the body elevates and the link 60 is free to rotate around its pivot 61 so that the roller 63 moves upwardly and to the left along the flange 64. The gate 24 opens under the action of its weight and the weight of the load thereagainst. The relation of the linkage is such that the gate opens to its fullest extent when the body is elevated through a relatively small angle, for example an angle of 15 degrees and at that time the flange 64 moves upwardly away from the roller 63 which thereafter moves in the air to a slight extent only in accordance with the change of position of the link 58 with the gate 24, as the body moves to its full tilt, for example through an angle of 55 or 60 degrees.

When the body is allowed to return to its normal position the flange 64 re-engages the roller 63 and returns the linkage to the position shown in full lines in Fig. 6, closing the gate 24. During the dumping operation just described the gate on the right hand side and the link 58 connected thereto do not move relatively to the body. Said link 58 pivots around the pivot 59, which is in line with the fulcrums 27 about which the body moves during said dumping operation.

Although the invention has been disclosed in connection with the specific details of preferred embodiments thereof it must be understood that such details are not intended to be limitative of the invention except in so far as set forth in the accompanying claims.

I claim:

1. A dump wagon comprising a chassis, a body mounted thereon adapted to be dumped to either side about spaced fulcrums, said body being provided with a pair of side gates, linkages controlling the opening and closing of said gates, each linkage being pivoted to a gate and to the chassis and having a joint in alignment with the fulcrum remote from the gate to which said linkage is attached, said linkage being adapted to contact with the body only during a limited part of the tilting movement in order to control the movement of the gate relative to said body.

2. A dump wagon comprising a chassis and a body adapted to dump to either side about spaced fulcrums, said body being provided with side gates, a link pivotally connected to a gate, a second link pivotally connected to the first link and to the chassis, and a roll carried by the common pivot of both links adapted to bear upwardly against the body to control the movement of the gate, said linkage comprising a pivot in alignment with the fulcrum remote from said gate.

3. A dump wagon comprising a chassis and a body adapted to dump to either side about spaced fulcrums, said body being provided with side gates, a link pivotally connected to a gate, a second link pivotally connected to the first link and to the chassis, and a roll carried by the common pivot of both links adapted to bear upwardly against the body to control the movement of the gate, the end of the second link remote from the first link being pivoted to the frame in alignment with the fulcrum remote from said gate.

4. A dump wagon comprising a chassis and a body adapted to dump to either side about spaced fulcrums, said body being provided with side gates, a link pivotally connected to a gate, a second link pivotally connected to the first link and to the chassis, and a roll carried by the common pivot of both links adapted to bear upwardly against the body to control the movement of the gate, the common pivot of the two links being normally located in alignment with the fulcrum remote from said gate and the other end of the second link being pivoted to the frame at a point inward of said fulcrum.

5. A dump wagon comprising a chassis and a body adapted to dump to either side about spaced fulcrums, said body being provided with side gates, a link pivotally connected to a gate, a second link pivotally connected to the first link and to the chassis, said linkage comprising a pivot in alignment with the fulcrum remote from said gate and said linkage having a free sliding upward engagement with the body so as to control the movement of the gate during dumping.

6. A dump wagon comprising a chassis and a body adapted to dump to either side about spaced fulcrums, said body being provided with side gates, a link pivotally connected to a gate, a second link pivotally connected to the first link and to the chassis, the end of the second link remote from the first link being pivoted to the frame in alignment with the fulcrum remote from said gate, said linkage having a free sliding upward engagement with the body to control the movement of the gate during dumping.

7. A dump wagon comprising a chassis and a body adapted to dump to either side about spaced fulcrums, said body being provided with side gates, a link pivotally connected to a gate, a second link pivotally connected to the first link and to the chassis, the common pivot of the two links being normally located in alignment with the fulcrum remote from said gate, and the other end of the second link being pivoted to the frame at a point intermediate of said fulcrums, said linkage being adapted to bear upwardly against the body to control the movement of the gate during dumping.

8. In a wagon adapted to dump to either side, in combination, a chassis, a body supported thereon and adapted to tilt to either side about spaced fulcrums, said body having side gates, said body being capable of being elevated about the fulcrums as axes, the fulcrums on either side being capable of being locked against elevation to cause the body to dump around said fulcrum when the body is elevated, and a linkage operatively associated with the chassis and each gate, each linkage being constituted by links of fixed length and having an upward sliding engagement with the body actuated by the dumping movement of the body automatically to open the gate on the dumping side.

9. A dump wagon comprising a chassis and a body adapted to dump to either side about spaced fulcrums, said body being provided with gates, said body being capable of being elevated about the fulcrums as axes, the fulcrums on either side of the body being capable of being locked against elevation so as to cause the body to dump around said fulcrum when the ram is elevated, a linkage pivotally secured to each gate and to said chassis and having an upward, sliding engagement with said body so that the gate on the dumping side is automatically opened by the dumping operation, each linkage being constituted by links of fixed length.

10. A dump wagon comprising a chassis, and a body adapted to be dumped to either side about spaced fulcrums, said body being provided with side gates, a linkage pivotally connected to a gate and to the chassis, said linkage having a free, sliding upward engagement with the body so as to automatically control the opening of the gate, said body being adapted to elevate out of contact with said linkage after said gate is opened.

11. A dump wagon comprising a chassis and a body adapted to be dumped to either side about spaced fulcrums, said body being provided with side gates, a linkage connected to a gate and to the chassis, and adapted to engage the body in such a manner that it permits the gate to open when the body is elevated, the movement of the linkage being such that the gate is fully opened when the body is elevated through a relatively small angle, said body being adapted to elevate out of contact with said linkage through a considerable angle into a dumping position.

12. A dump wagon comprising a chassis, a body mounted thereon adapted to be dumped to either side about spaced fulcrums, said body being provided with a pair of side gates pivotally mounted on the body adjacent their lower edges, a link pivotally secured to one of said gates at a point below its pivotal mounting, a second link pivotally connected to the first link and to the chassis at a point in alignment with the fulcrum remote from said gate, means adjacent the common pivot of said links bearing upwardly against the body intermediate the fulcra, the links being normally inclined upwardly to said common pivot, whereby the common pivot follows the body during the tilting operation and causes the gate to open upon said tilting.

13. A dump wagon comprising a chassis, a body mounted thereon adapted to be dumped to either side about spaced fulcrums, said body being provided with a pair of side gates pivotally mounted on the body adjacent their lower edges and being provided with arms which extend downwardly therebelow, links pivotally mounted connected to said arms and extending inwardly transversely with respect to the body, links pivotally connected to the first said links and extending away therefrom, the last said links being pivotally connected to the chassis at points in alignment with the fulcrum remote from the gate to which the linkage is connected, the links of each linkage being directed upwardly towards their common pivot and being adapted to bear against the underside of the body whereby the common pivot of the linkage connected to the gate on the dumping side tends to follow the body and permit the gate on that side to open during the initial part of the tilting operation.

14. A dump wagon comprising a chassis, a body adapted to dump to either side about spaced fulcrums, said body being provided with side gates pivotally mounted upon the body adjacent their lower edges, a link pivotally connected to a gate at a point above said edge, said link extending inwardly transversely of the body, a second link pivoted to the first said link, the second link being pivoted to the chassis, the common pivot of said links being normally located in alignment with the fulcrum remote from the gate to which the links are connected, and the end of the second link being pivoted to the chassis at a point inwardly thereof, means associated with the common pivot of the links bearing upwardly against the body and being adapted to move upwardly when the body is tilted so as to open said gate.

15. A dump wagon comprising a chassis, a body adapted to dump to either side about spaced fulcrums, said body being provided with side gates pivotally mounted upon the body adjacent their lower edges, a link pivotally connected to a gate at a point above said edge, said link extending inwardly transversely of the body, a second link pivoted to the first said link, the second link being pivoted to the chassis, the common pivot of said links being normally located in alignment with the fulcrum remote from the gate to which the links are connected, and the end of the second link being pivoted to the chassis at a point inwardly thereof, means associated with the common pivot of the links bearing upwardly against the body and being adapted to move upwardly when the body is tilted so as to open said gate, the ratio of the links being such that the gate is fully opened during the initial part of the dumping movement.

16. A dump wagon comprising a chassis, a body adapted to dump to either side about spaced fulcrums said body being provided with side gates pivotally mounted thereto adjacent their lower edges, a linkage connected to each side gate and to the chassis, each linkage comprising a link pivotally connected to a gate above its pivotal connection to the body and extending transversely across an end of the body so that its remote end may occupy a position in alignment with the fulcrum remote from the gate, said link being pivoted at said end to a second link which extends inwardly and is pivotally connected to the chassis, a roll carried by the common pivot of said links inwardly thereof and a plate carried by the body against which said roll is adapted to bear upwardly, said links being proportioned so that the gate fully opens when the body is tilted through a relatively small angle in its movement towards dumping position.

17. In a wagon adapted to dump to either side, in combination, a chassis, a body supported thereon and adapted to tilt to either side about spaced fulcrums, said body having side gates, said body being capable of being elevated about the fulcrums as axes, the fulcrums on either side being capable of being locked against elevation so as to cause the body to dump around said fulcrums when the body is elevated, and a linkage system located below the body and connected to the gates and chassis and cooperating with the body to effect complete opening of the descending gate to a position substantially parallel with the floor of the body during the early part of the tilting of the body, said linkage system permitting further movement of the body to full tilting position without changing the relative position of the gate and body.

18. In a wagon adapted to dump to either side, in combination, a chassis, a body supported thereon and adapted to tilt to either side about spaced fulcrums, said body having side gates, said body being capable of being elevated about the fulcrums, as axes, the fulcrums on either side being capable of being locked against elevation so as to cause the body to dump around said fulcrums when the body is elevated, and a linkage connected to the gate, connected to the chassis and having a free connection with the body adapted to control the complete opening of the gate to a position substantially parallel with the floor of the body while the body tilts through a small initial part of its full tilting angle, said linkage permitting further movement of the body to full tilting position without changing the relative position of said gate and body.

19. In a wagon adapted to dump to either side, in combination, a chassis, a body supported thereon and adapted to tilt to either side about spaced fulcrums, said body having side gates, said body being capable of being elevated about the fulcrums, as axes, the fulcrums on either side being capable of being locked against elevation so as to cause the body to dump around said fulcrums when the body is elevated, and a linkage connected to the gate, connected to the chassis and having a temporary abutting relation with the body adapted to control the complete opening of the gate to a position substantially parallel with the floor of the body while the body tilts through a small initial part of the full tilting angle, said linkage permitting further movement of the body to full tilting position without changing the relative position of said gate and body.

JOSEPH KUCHAR.